(12) United States Patent         (10) Patent No.:     US 8,094,322 B2
Mayer et al.                      (45) Date of Patent:     Jan. 10, 2012

(54) METHOD AND APPARATUS FOR THE DETERMINATION OF THE 3D COORDINATES OF AN OBJECT

(75) Inventors: Thomas Mayer, Kolbermoor (DE); Marcus Steinbichler, Neubeuern (DE); Alexander Frey, Bernau a. Chiemsee (DE)

(73) Assignee: Steinbichler Optotechnik GmbH, Neubeuern (DE)

( * ) Notice: Subject to any disclaimer, the term of this patent is extended or adjusted under 35 U.S.C. 154(b) by 320 days.

(21) Appl. No.: 12/383,519

(22) Filed: Mar. 25, 2009

(65) Prior Publication Data

US 2009/0284757 A1    Nov. 19, 2009

(30) Foreign Application Priority Data

Mar. 25, 2008    (DE) .................. 10 2008 015 499

(51) Int. Cl.
 *G01B 11/24* (2006.01)
(52) U.S. Cl. .................. 356/602; 356/603; 356/625
(58) Field of Classification Search .......... 356/600–636; 382/154, 286
See application file for complete search history.

(56) References Cited

U.S. PATENT DOCUMENTS

| 4,443,705 | A | * | 4/1984 | DiMatteo et al. | 250/558 |
| 4,590,367 | A | * | 5/1986 | Ross et al. | 250/205 |
| 4,653,104 | A | * | 3/1987 | Tamura | 382/154 |
| 4,724,480 | A | * | 2/1988 | Hecker et al. | 348/95 |
| 4,846,577 | A | * | 7/1989 | Grindon | 356/610 |
| 5,307,151 | A | * | 4/1994 | Hof et al. | 356/604 |
| 5,557,410 | A | * | 9/1996 | Huber et al. | 356/604 |
| 5,636,025 | A | * | 6/1997 | Bieman et al. | 356/619 |
| 6,503,195 | B1 | * | 1/2003 | Keller et al. | 600/160 |
| 6,734,980 | B1 | | 5/2004 | Brash et al. | |
| 7,009,718 | B2 | * | 3/2006 | Fujita | 356/604 |
| 7,342,668 | B2 | * | 3/2008 | Quadling et al. | 356/603 |
| 7,502,125 | B2 | * | 3/2009 | Suzuki | 356/604 |
| 2005/0111726 | A1 | | 5/2005 | Hackney et al. | |
| 2008/0130016 | A1 | | 6/2008 | Steinbichler et al. | |

FOREIGN PATENT DOCUMENTS

DE    10 2006 048234    4/2008

* cited by examiner

*Primary Examiner* — Sang Nguyen
(74) *Attorney, Agent, or Firm* — Dilworth & Barrese, LLP.

(57) ABSTRACT

In a method for the determination of the 3D coordinates of an object (2), a pattern is projected (1) onto the object (2) and the pattern reflected by the object (2) is taken (3) and evaluated. To improve such a method, a pattern is projected onto a first part region (12) of the object (2) in a first step and the pattern reflected by this part region (12) of the object (2) is taken. In a second step, a pattern is projected onto a second part region of the object (2) and the pattern reflected by this part region of the object (2) is taken. The patterns taken are evaluated.

20 Claims, 4 Drawing Sheets

Figure 1:
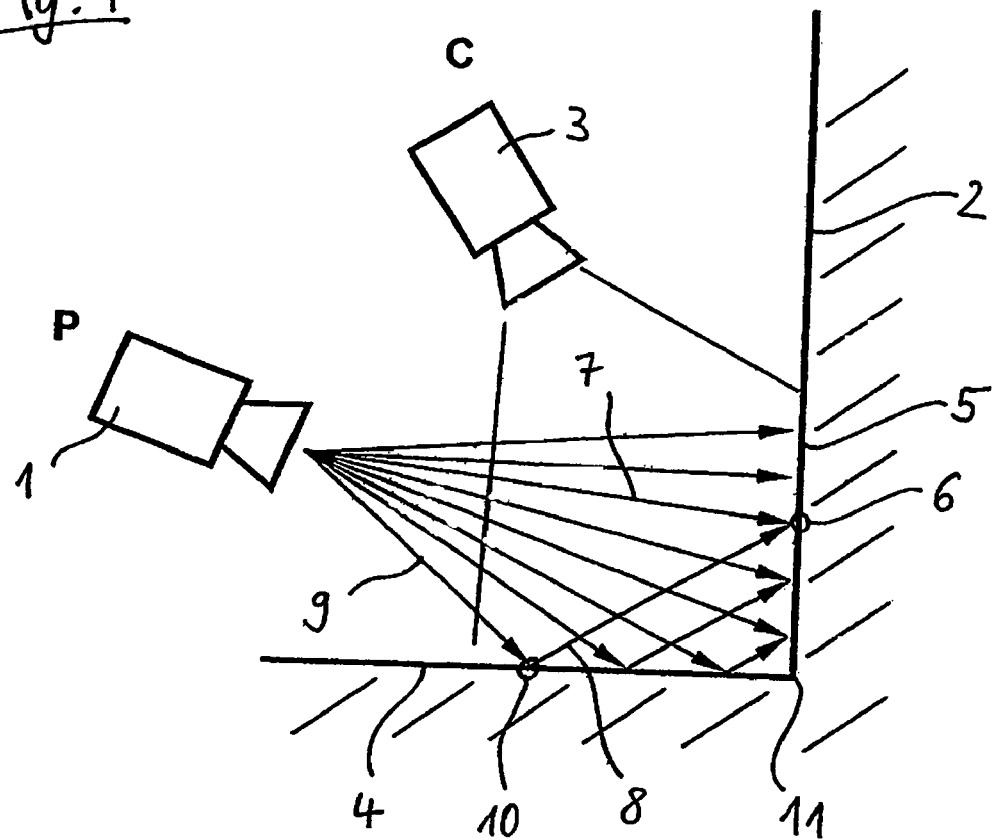

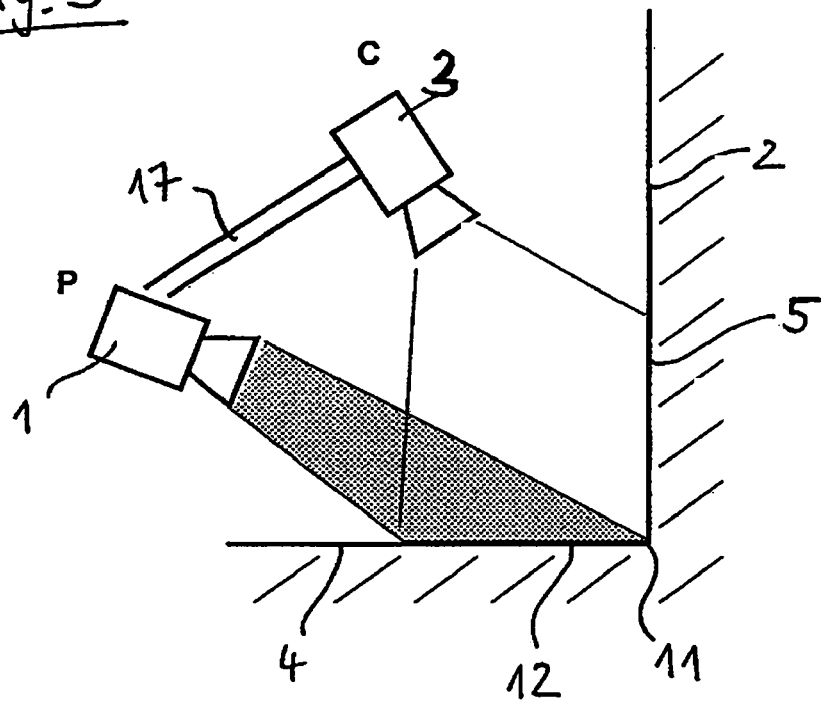
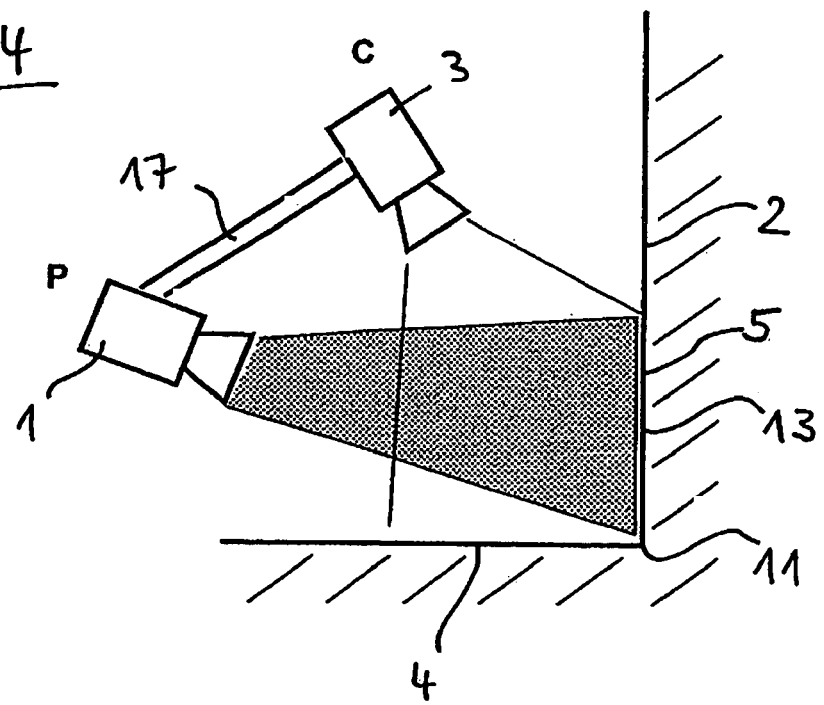

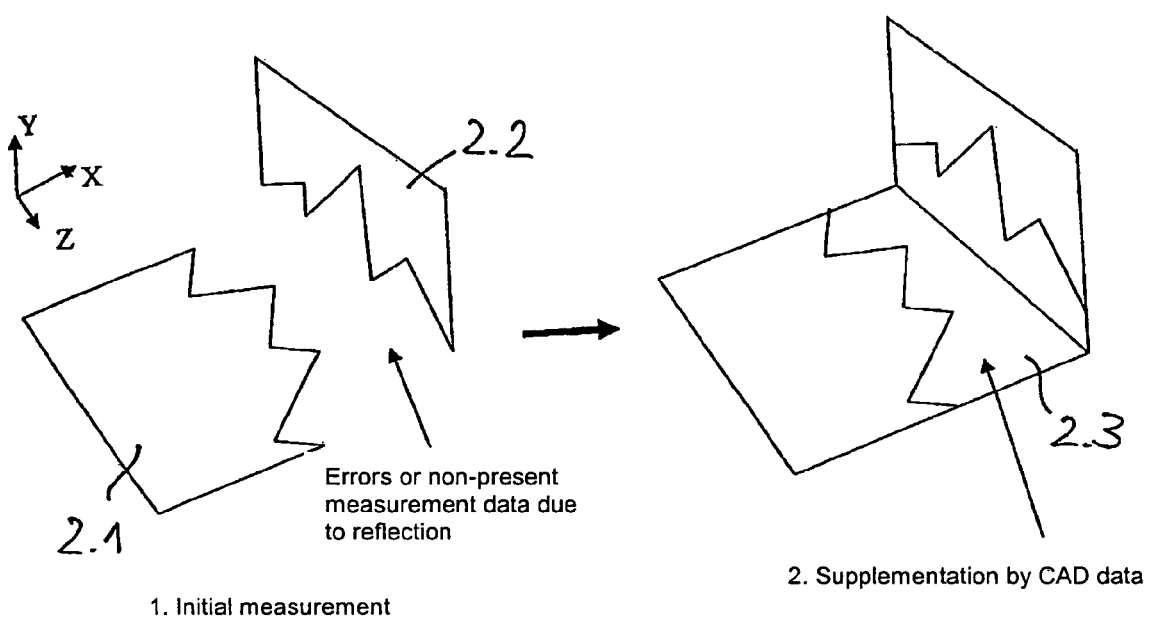

METHOD AND APPARATUS FOR THE DETERMINATION OF THE 3D COORDINATES OF AN OBJECT

BACKGROUND OF THE INVENTION

The invention relates to a method for the determination of the 3D coordinates of an object and to an apparatus for the carrying out of such a method.

Methods and apparatus for the three-dimensional digitization of objects are already known. In this method, a pattern is projected onto the object by a projector. The pattern on the object is detected using one or more cameras. The projector and the camera or cameras can be integrated in a so-called 3D sensor from a construction aspect.

In particular the three-dimensional digitizing of objects by means of white light stripe projection is already known. In this process, a stripe image is projected onto the object to be digitized by a projector. The stripe image on the object is then detected by one or more cameras. The 3D coordinate of the object surface can be determined from this for the object region illuminated by the projector and detected by the camera or cameras.

To achieve good measurement results with respect to the three-dimensional measurement precision and to the noise of the measured data, the process requires a surface which reflects as ideally diffusely as possible (a so-called Lambert surface). In practice, however, the object whose 3D coordinates should be determined often have a shiny surface which does not reflect the incident light perfectly diffused, but rather more or less greatly directed. This is in particular the case with ground or polished metal surfaces or with shiny plastic surfaces.

To solve the problems associated with this, it is possible to apply a white, diffusely reflecting layer onto shiny surfaces to enable a determination of the 3D coordinates with a quality which is as high as possible. The layer can be applied using a spray. The coating of the surface of the object before the determination of the 3D coordinates, however, brings along some different disadvantages: An additional time and material effort arises and thus costs for the application and optionally the later removal of the layer from the object. The thickness of the applied layer can falsify the 3D coordinates of the object surface to be determined. No additional layer can be applied to sensitive materials since the object can hereby be damaged or destroyed. The application of the layer usually takes place manually and is therefore not practical in a measurement system in which a large number of objects should be measured automatically.

On the determination of the 3D coordinates of an object having a shiny surface, measurement errors can arise due to the pattern reflected in a directed manner at the object when the reflected light is again incident on another point on the object and is superimposed on the light projected directly onto the object at this point. This is in particular the case at inner edges of the object where the light reflected by a flank of the inner edge is partly incident onto the oppositely disposed flank. To illustrate this problem The apparatus shown in FIG. 1 includes a projector 1 for the projection of a pattern, in particular of a stripe pattern, onto an object 3 and a camera 3 for the taking of the pattern reflected by the object 2. The surface of the object 2 has an inner edge which includes a horizontal flank 4 and a vertical flank 5 which impact at an inner corner point 11. The light from the projector 1 projected onto the horizontal flank 4 is partly reflected diffusely from the at least partly shiny surface of the horizontal flank 4 and is mirrored to another part at the vertical flank 5. The proportion of light reflected at the vertical flank 5 is partly reflected diffusely there and partly mirrored again. In particular the portion diffusely reflected at the vertical flank 5 is overlaid with that portion of the light from the projector 1 which is directly incident onto the vertical flank 5 and is diffusely reflected there. Both light portions arrive at the camera 3 and falsify the measurement.

For example, both the light ray 5 directly incident from the projector and the mirrored ray 8 of the light ray 9 directed to the horizontal flank 4 reach the point 6 of the surface of the vertical flank 5. On the image detection with the camera 3, the intensity of the light projected directly onto the object surface is detected for the respective object point and the intensity of the light of another object point (in the selected example, of the object point 10 on the horizontal flank 4 onto which the light ray 9 is incident) mirrored at this point by the shiny surface is detected.

Figure 2:
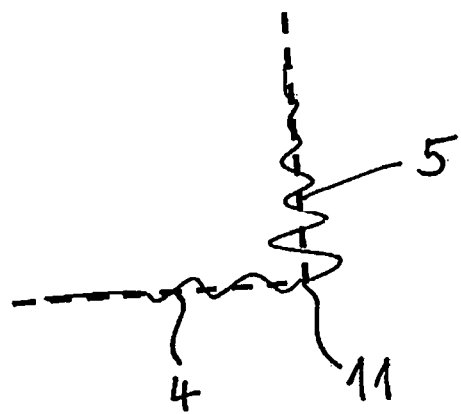

The quality of the 3D coordinate data which should be determined is the poorer, the larger the proportion of the light not projected directly by the projector, but rather reflected indirectly at the object. This is shown schematically in FIG. 2 for the example of the inner edge of FIG. 1. The noise of the measured data is symbolized there by the amplitude of the vibration. The noise of the measured data is the greater, the smaller the spacing of the respective object point from the inner corner point 11 of the inner edge. FIG. 2 shows the measurement error in an exaggerated representation, with the measured data being shown by the solid line and the desired data by the dashed line.

A method is known from the older priority, not pre-published German patent application 10 2006 048 234 for the determination of the 3D coordinates of an object in which a stripe pattern is projected onto the object and the pattern reflected by the object is taken and evaluated.

SUMMARY OF THE INVENTION

It is the object of the invention to provide an improved method and an improved apparatus for the determination of the 3D coordinates of an object.

This object is solved in accordance with the invention in a method for the determination of the 3D coordinates of an object by the features herein. In the method, a pattern, in particular a stripe pattern, is projected onto the object. The pattern reflected by the object is taken and evaluated. In a first step, a pattern is projected onto a first part region of the object and the pattern reflected by this part region of the object is taken. In a second step, a pattern is projected onto a second part region of the object and the pattern reflected by this part region of the object is taken. The part regions are selected such that as little indirect light as possible, or no indirect light at all, is incident onto the respective part region. The patterns taken are evaluated. The evaluation can be carried out in any step and the evaluated images can be put together to a total image. It is, however, also possible first to take the reflected patterns in both steps and optionally to store them in an intermediate step and subsequently to evaluate them together.

Different patterns, in particular stripe patterns, can be used for the method in accordance with the invention. The stripe patterns can have a different direction, frequency (stripe spacing, period) and/or amplitude curve. The camera or cameras is/are in particular digital area scan cameras. The calculation of the 3D coordinates of the object usually takes place in an evaluation computer by the evaluation of the images, in particular stripe images, taken by the camera or cameras. In this context, the gray code method, the phase shift method, the multi wavelength method or another method or a combination of these methods can be used.

The patterns, in particular stripe patterns, can be applied to a glass transparency in the projector. It is, however, also possible to project the pattern onto the object through an imaging element in the projector. Imaging elements for fast pattern projection are particularly suitable. The imaging element can be controllable. The imaging element is preferably controllable in a pixelwise manner. Shorter measuring times can be achieved by using an imaging element. The pattern can be projected onto the object by an LCOS display, a mirror array, a DMD and/or an LCD display.

The part regions on the object can be selected so that they do not overlap one another or only overlap one another slightly. Instead or additionally, it is advantageous if the part regions completely fill up a specific region of the object, with this specific region preferably being the region of the object for which the 3D coordinates should be determined. It is advantageous if the part regions do not overlap and if the part regions completely fill up a specific region of the object. The interfering light is minimized in this case. It is simultaneously possible to determine the 3D coordinates in the total specific region.

Advantageous further developments of the invention are described herein.

It is advantageous if the surface normals of the object points are determined and if the object points are associated with the part regions of the object in dependence on their surface normals. The reflection behavior of the object points is determined by their surface normals. It is therefore advantageous to associate the object points with the part regions of the object in dependence on their surface normals.

A further advantageous further development is characterized in that the surface normals of the object points of the first part region and of the second part region are disposed on different sides of the projection rays. The comparison between the surface normals of an object point and of the projection ray to this object point allows the recognition of inner edges and thus an association of the object points to the different part regions in a manner such that interfering light reflections can be avoided.

In accordance with a further advantageous further development the 3D coordinates of the object are roughly determined before the first and second steps.

This rough determination of the 3D coordinates of the object preferably takes place in the manner that a pattern, in particular a stripe pattern, is projected onto the object and the pattern reflected by the object is taken and evaluated. The part regions for the first and second steps can be determined on the basis of the rough determination of the 3D coordinates of the object.

In accordance with a further advantageous further development, the rough determination of the 3D coordinates of the object takes place in that the 3D coordinates of the object are called up from a memory. The 3D coordinates of the object are preferably stored in the memory in the form of a CAD data set. It can be particularly advantageous if the 3D coordinates of the object are first roughly determined in a manner such that a pattern, in particular a stripe pattern, is projected onto the object and the pattern reflected by the object is taken and evaluated and, if subsequently the 3D coordinates are called up from a memory, preferably in the form of CAD data, in that partial region in which the 3D coordinates of the object were not able to be determined sufficiently roughly in this manner.

An apparatus in accordance with the invention for the determination of the 3D coordinates of an object includes a projector for the projection of a pattern, in particular of a stripe pattern, onto the object, a camera for the taking of the pattern reflected by the object and an evaluation unit for the evaluation of the taken pattern. The apparatus furthermore includes a device for the projection of a pattern onto a first partial region of the object and for the projection of a pattern onto a second part region of the object.

Advantageous further developments of the apparatus in accordance with the invention are the subject of the description herein.

The apparatus preferably includes a device for the determination of the surface normals of the object points and for the association of the object points to the part regions of the object in dependence on their surface normals.

The apparatus furthermore preferably includes a device for the association of the object points to the part regions such that the surface normals of the object points of the first part region and of the second part region lie on different sides of the project rays.

The apparatus preferably includes a device for the rough determination of the 3D coordinates of the object before the first and second steps. This device preferably includes a projector for the projection of a pattern onto the object, a camera for the taking of the pattern reflected by the object and an evaluation unit for the evaluation of the taken pattern. Instead or additionally, the device for the rough determination of the 3D coordinates of the object before the first and second steps can include a memory from which the 3D coordinates of the object are called up, with the 3D coordinates of the object preferably being stored in the memory in the form of a CAD data set.

Embodiments of the invention will be explained in detail in the following with reference to the enclosed drawing. There are shown in the drawing FIG. 1 shows an apparatus for the determination of the 3D coordinates of an object using a projector and a camera in a schematic side view; and FIG. 2 shows the measurement error at the inner edge of the object in accordance with FIG. 1 in a schematic representation.

Figure 5:
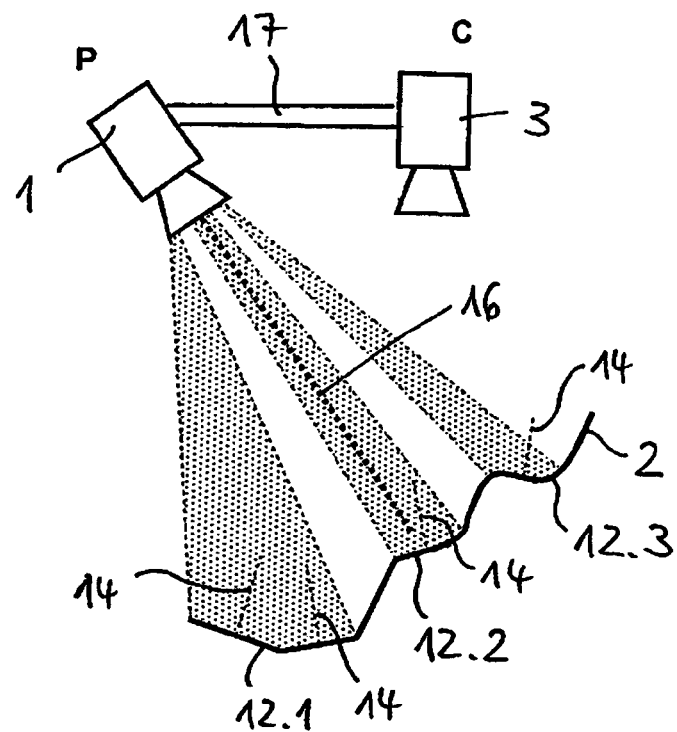
Figure 6:
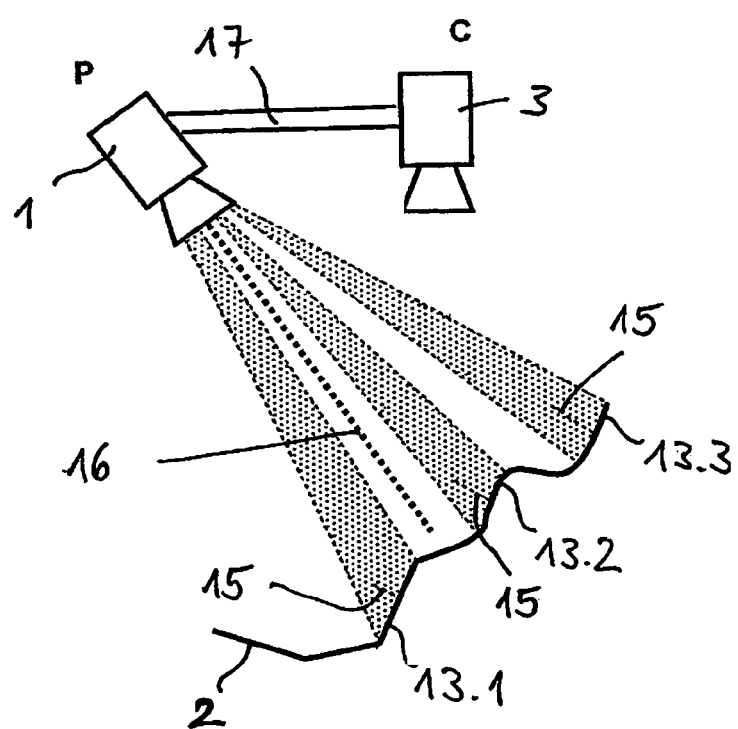

FIG. 3 an apparatus for the determination of the 3D coordinates of an object comprising a projector and a camera in a schematic side view, with a pattern being projected onto a first part region of the object;

FIG. 4 the apparatus in accordance with FIG. 3, with a pattern being projected onto a second part region of the object;

FIG. 5 the apparatus in accordance with FIGS. 3 and 4 for the determination of the 3D coordinates of another object, with a pattern being projected onto a first part region of the object;

FIG. 6 the apparatus in accordance with FIGS. 3 to 5, with a pattern being projected onto a second part region of the object in accordance with FIG. 5; and FIG. 7 a further object whose 3D coordinates are roughly determined in one part region by the projection of a pattern and the taking and evaluation of the reflected pattern and in another part region by a calling up from a memory.

DESCRIPTION OF THE PREFERRED EMBODIMENTS

The apparatus shown in FIG. 3 for the determination of the 3D coordinates of an object 2 substantially corresponds to that in accordance with FIG. 1. It includes a projector 1 for the projection of a stripe pattern onto the object 2, a camera 3 for the taking of the stripe pattern reflected by the object 2 and an evaluation unit not shown in the drawing for the evaluation of the taken pattern. The projector 1 and the camera 3 are connected to one another by a component 17, for example a housing or an element of a housing, so that the relative position of the projector 1 to the camera 3 remains unchanged.

The method for the determination of the 3D coordinates of the object 2 is carried out in a manner such that first the 3D coordinates of the object 2 are roughly determined, and indeed in that a stripe pattern is projected onto the total object 2 by the projector 1 and such that the pattern reflected by the total object 2 is taken and evaluated by the camera 3.

Subsequently, in a first step, a stripe patter is projected onto a first part region 12 of the object and the pattern reflected by this part region 12 is taken and evaluated. The first part region 12 is located on the horizontal flank 4 of the object 2 and reaches up to the inner corner point 11.

In a second step, which is shown in FIG. 4, a stripe pattern is projected onto a second part region 13 of the object 2 by the projector 1 and the pattern reflected by this part region 13 is taken by the camera 3 and evaluated. The second part region 13 is located on the vertical flank 5 of the object 2. It reaches up to the inner corner point 11.

The part regions 12, 13 are located on different sides of the inner edge of the object 2 formed by the inner corner point 11. As can be seen from FIGS. 3 and 4, it is possible that in each case a pattern is only projected onto a part region 12, 13 of the object 2, but that the camera 3 in each case takes the total object 2 in both cases. The evaluation, however, takes place in a manner such that on the projection of the pattern onto the first part region 12 in accordance with FIG. 3, only this first part region 12 is evaluated and such that on the projection of the pattern onto the second part region 13 in accordance with FIG. 4 only the pattern reflected by this part region 13 of the object 2 is evaluated. The evaluation can in each case take place directly on or after the taking of the respective part region 12, 13. The evaluations can be put together to form a total image immediately or later. It is, however, also possible first to store the records of the part regions 12 and/or 13 and to evaluate them together later.

FIGS. 5 and 6 show another object whose 3D coordinates are determined with the same apparatus as in FIGS. 1, 3 and 4. Here, too, the 3D coordinates of the object 2 are first roughly determined in that a pattern is projected onto the object 2 by the projector 1 and the pattern reflected by the object 2 is taken by a camera 3 and evaluated.

The surface normals of the object points are determined on the basis of the 3D coordinates roughly determined in this manner. The object points are associated with different part regions of the object 2 in dependence on their surface normals. This is done in a manner such that the surface normals of the object points of the first region and of the second region are disposed on different sides of the projection rays.

The first part region is shown in FIG. 5. This part region is made up of three sub-regions 12.1, 12.2 and 12.3. The surface normals for object points in these sub-regions are provided with the reference numeral 14. Their extensions are each disposed to the right of the projector 1.

In FIG. 6, the respective part region 13 is shown which is made up of the sub-regions 13.1, 13.2 and 13.3. The surface normals in these sub-regions are provided with the reference numeral 15. The extensions of the surface normals 15 are each disposed to the left of the projector 1. The surface normals of the object points of the first part region 12 and of the second part region 13 are accordingly disposed on different sides of the projection rays 16 which extend from the projector 1 to the respective object point.

As can be seen from FIGS. 5 and 6, the object points are associated with the part regions 12, 13 of the object 2 in dependence on their surface normals. Surface normals which extend to the right next to the projector 1 can be called positive surface normals since they include a positive angle between themselves and the projection ray which leads from the projector 1 to the respective object point. In a corresponding manner, a negative angle can be associated with surface normals which run past the projector 1 to the left. The object points with a positive angle of the surface normals 14 are associated with the first part region 12; the object points with a negative angle of the surface normals 15 are associated with the second part region 13. In this manner, each object point can be associated with a part region 12, 13. The part regions 12, 13 do not overlap. They completely fill up the total image region, that is, the total region of the object 2 to be evaluated. Inner edges of the object which would otherwise cause interfering reflections are reliably recognized by the association of the object points in dependence on their surface normals.

FIG. 7 shows an embodiment in which the 3D coordinates of an object 2 are stored in a memory, and indeed in the form of a CAD data set. The 3D coordinates of the object 2 are first roughly determined, namely in that a pattern is projected onto the object 2 and the pattern reflected by the object 2 is taken and evaluated. Since the object 2 has an inner edge, the 3D coordinates cannot initially be determined sufficiently accurately. They are only determined sufficiently accurately in the part regions 2.1 and 2.2, but not in the region adjacent to the inner corner point 11.

The rough determination of the 3D coordinates in this region 2.3 adjacent to the inner corner point 11 takes place in that the 3D coordinates of the object 2 for this region are called up from the memory. In this manner, the 3D coordinates of the total object 2 can be roughly determined, as can be seen from the right hand illustration of FIG. 7.

The already described method is then carried out in which the surface normals of the object points are determined, the object points are associated with different part regions of the object in dependence on their surface normals, a pattern is projected onto a first part region of the object in a first step and the pattern reflected by this part region of the object is taken and evaluated and a pattern is projected onto the second part region of the object in a second step and the pattern reflected by this part region of the object is taken and evaluated.

A method is provided by the invention with which the measurement errors of the projector light reflected by the object can be precluded in that a projection adapted to the object to be measured is realized. The adapted projection can be generated via an imaging element (LCD, LCOS, DMD, transparency) integrated in the projector.

The method can be carried out in the following manner: An initial measurement of the object takes place for the determination of the rough 3D data of the surface to be digitized. The object surface measured in this manner is segmented into object regions such that the angles of the surface normals in each 3D measured point to the projector are determined and such that surface regions are assigned into two or more classes, with surface regions with a similar alignment of the surface normals to the projector being assigned into the same class. Each measured surface point is calculated back into the image coordinate system of the projector to determine the associated image element of the imaging element in the projector (LCD, LCOS, DMD). Subsequently, two or more digitizing processes of the object surface are carried out sequentially in time with an adapted projection such that light is only projected by the projector onto the object regions which were assigned to the same class and such that no light is projected by the projector to other object regions. The camera can detect the total object surface. It is, however, also possible that the camera only detects the desired object regions. Finally, the 3D data of every single measurement are put together into a common 3D data set of the object surface.

When the geometry of the object is known, for example in a CAD data set, the method can be carried out as follows: First, as described above, an initial measurement of the object takes place for the determination of the rough 3D data of the surface to be digitized. Subsequently, the orientation of the rough 3D data to the stored CAD data set is determined, and indeed by suitable matching algorithms. The position of the camera or the position of the sensor comprising the projector and the camera in space can thereby be determined. Subsequently, the determination of the region covered by the record in the CAD data takes place by the simulation of the sensor, that is, the determination of the regions which are covered by the camera and the projector simultaneously and have suitable criteria. The simulated data and the 3D data of the first initial measurement can be combined to take account of deviations of the real object from the CAD data set. In this respect, only the blank positions in the 3D data are supplemented by simulated data. The total following calculation can, however, also only take place on the basis of CAD data to reduce the calculation time. Finally, the routine described above is carried out, starting with the segmentation of the measured object surface into different object regions.

In the procedure in accordance with FIGS. 3 and 4, an inner edge of a measured object is measured. The measurement comprises two individual measurements which are subsequently put together to form a total data set. Interfering reflections are avoided by the temporally separate pattern projection onto the two inner edge regions.

In the embodiment in accordance with FIGS. 5 and 6, a freely shaped object is measured. The measurement comprises two individual measurements, with object regions with a similar orientation of the surface normal to the optical axis of the projector being measured separately to avoid interfering reflections.

In the embodiment in accordance with FIG. 7, CAD data are used to obtain a complete model and to derive the projection sequences from it.

The invention provides a method and an apparatus for the 3D digitizing of surfaces, comprising a projector and one or more cameras with a measurement routine with adapted light projection for the avoidance of interfering light reflections at the measured object for the improvement of quality of the measured object data. The rough 3D data of the measured object can be determined in a first measurement sequence. The surface normals of the measured object points can be calculated and their alignment to the projector can be determined in a calculation step and surface regions can be assigned to at least two classes. Optionally present CAD data can be used for the determination of the surface normals and their orientation to the projector by simulation to be able to thus compensate blank points in the first measurement sequence and to reduce the calculation times. The surface coordinates of the respective object regions are measured separately from one another via a projection adapted to the object in at least two further measurement sequences. The adapted light projection can be realized using an imaging element (LCD, LCOS, DMD, transparency). The adapted light projection can be carried out such that the intensity of the light projected by the projector onto the respective object position is adapted in dependence on the surface normal of the measured object. The evaluation can take place such that the object coordinates from the individual measurement sequences are combined to form a data set.

The invention claimed is:

1. A method for the determination of the 3D coordinates of an object (2) in which a pattern is projected (1) onto the object (2) and the pattern reflected by the object (2) is taken (3) and evaluated, comprising:
    dividing by an evaluation device the object into part regions based upon surface normals of the pattern projected on the object;
    projecting by a projector a pattern onto a first part region (12) of the object (2) and the pattern reflected by this part region (12) of the object is taken by a camera;
    projecting by the projector a pattern onto a second part region (13) of the object (2) and the pattern reflected by this part region (13) of the object (2) is taken by the camera; and
    evaluating by the evaluation device the taken patterns to determine the 3D coordinates of the object based on the based on patterns reflected by the first part region of the object (2) and the second part region of the object (2).

2. A method in accordance with claim 1, wherein the surface normals (14, 15) of the object points are calculated; and the object points are associated with the part regions (12, 13) of the object (2) in dependence on their surface normals (14, 15).

3. A method in accordance with claim 2, wherein the surface normals (14, 15) of the object points of the first (12) and second part region (13) are disposed on different sides of the projection rays (16).

4. A method in accordance with claim 3, wherein the 3D coordinates of the object (2) are roughly determined before the first and second steps.

5. A method in accordance with claim 1, wherein the surface normals (14, 15) of the object points of the first (12) and second part region (13) are disposed on different sides of the projection rays (16).

6. A method in accordance with claim 1, wherein the 3D coordinates of the object (2) are roughly determined before the first and second steps.

7. A method in accordance with claim 6, wherein the rough determination of the 3D coordinates of the object taking place in that a pattern is projected (1) onto the object (2) and the pattern reflected by the object (2) is taken (3) and evaluated.

8. A method in accordance with claim 6, wherein the rough determination of the 3D coordinates of the object (2) is carried out in that the 3D coordinates of the object (2) are called up from a memory.

9. An apparatus for the determination of the 3D coordinates of an object (2) comprising:
    a projector (1) for the projection of a pattern onto the object (2);
    a camera (3) for the taking of the pattern reflected by the object (2); and
    an evaluation device for the evaluation of the taken pattern, wherein the evaluation device divides the object (2) into part regions based upon surface normals of the pattern projected on the object, the projector projects a pattern onto a first part region of the object (2) and a second part region of the object (2), the camera takes patterns reflected by the first part region of the object (2) and the second part region of the object (2), and the evaluation device determines the 3D coordinates of the object based on patterns reflected by the first part region of the object (2) and the second part region of the object (2).

10. An apparatus in accordance with claim 9, wherein said evaluation device determines the surface normals of the object points and association of the object points to the part regions of the object in dependence on their surface normals.

11. An apparatus in accordance with claim 10, wherein said evaluation device associates the object points to the part regions such that the surface normals of the object points of the first and second region are disposed on different sides of the projection rays.

12. An apparatus in accordance with claim 11, wherein said evaluation device determines an approximation of the 3D coordinates of the object.

13. An apparatus in accordance with claim 12, comprising a memory for the storing of the 3D coordinates of the object.

14. An apparatus in accordance with claim 10, wherein said evaluation device determines an approximation of the 3D coordinates of the object.

15. An apparatus in accordance with claim 14, comprising a memory for the storing of the 3D coordinates of the object.

16. An apparatus in accordance with claim 9, wherein said evaluation device associates the object points to the part regions such that the surface normals of the object points of the first and second region are disposed on different sides of the projection rays.

17. An apparatus in accordance with claim 16, wherein said evaluation device determines an approximation of the 3D coordinates of the object.

18. An apparatus in accordance with claim 17, comprising a memory for the storing of the 3D coordinates of the object.

19. An apparatus in accordance with claim 9, wherein said evaluation device determines an approximation of the 3D coordinates of the object.

20. An apparatus in accordance with claim 19, comprising a memory for the storing of the 3D coordinates of the object.

* * * * *